United States Patent [19]
Wittrisch

[11] Patent Number: 4,898,237
[45] Date of Patent: Feb. 6, 1990

[54] PROBE AND ITS MULTIDIRECTIONAL ANCHORING DEVICE IN A WELL

[75] Inventor: Christian Wittrisch, Rueil Malmaison, France

[73] Assignee: Institut Francais du Petrole, Rueil Malmaison, France

[21] Appl. No.: 257,309

[22] PCT Filed: Dec. 23, 1987

[86] PCT No.: PCT/FR87/00515
§ 371 Date: Aug. 24, 1988
§ 102(e) Date: Aug. 24, 1988

[87] PCT Pub. No.: WO88/05108
PCT Pub. Date: Jul. 14, 1988

[30] Foreign Application Priority Data
Dec. 24, 1986 [FR] France .................. 86 18258

[51] Int. Cl.⁴ .............................................. E21B 47/00
[52] U.S. Cl. ..................................... 166/66; 166/206; 166/241; 181/102; 367/25
[58] Field of Search .............. 166/65.1, 66, 100, 206, 166/213, 214, 241, 250; 175/1, 40, 45, 50; 33/304, 340, 347, 350; 181/102, 106, 108, 112, 122; 367/25, 86; 73/151, 152

[56] References Cited
U.S. PATENT DOCUMENTS

| | | |
|---|---|---|
| 3,104,709 | 9/1963 | Kenneday et al. |
| 3,244,253 | 4/1966 | Blizard .................. 367/25 |
| 3,426,865 | 2/1969 | Henry .................... 367/86 |
| 3,683,326 | 8/1972 | White .................... 367/25 |
| 3,858,651 | 1/1975 | Wolk ..................... 166/100 |
| 4,130,816 | 12/1978 | Vogel et al. ............ 166/241 |
| 4,610,309 | 9/1986 | O'Brien et al. ......... 166/382 |
| 4,670,862 | 6/1987 | Staron et al. .......... 367/25 |
| 4,686,653 | 8/1987 | Staron et al. .......... 367/25 |
| 4,711,303 | 12/1987 | Koeling et al. ........ 166/250 |
| 4,744,438 | 5/1988 | Ruzie et al. ........... 181/102 |

FOREIGN PATENT DOCUMENTS

| | | |
|---|---|---|
| 0178784 | 4/1986 | European Pat. Off. |
| 2548727 | 1/1985 | France . |
| 2591757 | 6/1987 | France . |

Primary Examiner—Bruce M. Kisliuk
Attorney, Agent, or Firm—Antonelli, Terry & Wands

[57] ABSTRACT

A probe and anchoring device for anchoring the probe and the well, with the probe having an axis parallel to a well axis and including a probe body supporting the anchoring device. The anchoring device is provided with two arms which are offset angularly with respect to each other in relation to the axis of the probe, with the arms being so arranged that when they are deployed, the probe comes directly into contact with the walls of the well.

10 Claims, 1 Drawing Sheet

PROBE AND ITS MULTIDIRECTIONAL ANCHORING DEVICE IN A WELL

BACKGROUND OF THE INVENTION

The present invention relates to a probe and anchoring device for anchoring the probe in a well.

Probes having deployable arms, known in the prior art, generally have one or two arms which are located on the same generatrix of the probe body.

When such probes are equipped with two unidirectional measuring elements sensitive to the movements of the well walls, these measuring elements are placed such that the plane defined by deployment of the arms is a plane bisecting the measuring axes of each of these elements. The deployment plane contains the probe axis. The measuring axes are generally perpendicular to each other and intersect the axis of the probe at the same point.

Thus, according to the prior art, the probe and its arms touch the wall along a plane. Although this arrangement does transmit to the measuring elements the movements of the geological formation which are contained in this plane, it only poorly transmits the movements not contained therein, particularly those perpendicular to this plane.

In the latter case, the stiffness of the probe plus anchoring arm assembly is low and parasitic movements, particularly vibrations due to this lack of stiffness, are detected by the measuring elements.

Thus, the present invention relates to a device for anchoring a probe in a well, with the probe having an axis parallel to the well axis and having a probe body which supports anchoring device provided with arms.

In addition, this anchoring device has, essentially at the same level as the probe axis, two arms offset angularly with respect to each other relative to the axis of the probe. The arms are disposed such that, when they are deployed, the probe comes directly into contact with the well walls.

A portion of the outer wall of the probe body, essentially adjacent to the plane bisecting the deployment planes of the arms, and opposite the latter, can be designed to permit good direct attachment of said body to the well walls.

Preferably, the arms can be offset by an angle of 90° with respect to the axis of said probe or may be offset by an angle of 120°.

The device according to the invention may have two other arms located at a different level than that of the first two arms.

The two levels may be located on either side of the measuring element with which the probe is equipped.

The present invention also relates to a probe equipped with the anchoring device described above, with the probe may have at least one directional measuring element operating in the plane defined by deployment of one of the arms.

The deployment plane of one of the arms may contain the probe axis.

The measuring direction of one of the measuring elements may be substantially perpendicular to the axis of the probe.

At least one measuring element of the probe may be located substantially in the vicinity of one of the levels.

The probe according to the present invention may comprise two unidirectional measuring elements, one of which may operate in a plane defined by the deployment of one of the arms and the other may operate in the plane of deployment of another arm.

The probe according to the invention may comprise a third unidirectional measuring element.

The arms may be placed at the same level as the probe axis and at least one measuring element may be placed substantially in the vicinity of this same level and effect measurements in directions substantially perpendicular to the probe axis.

Preferably two and possibly three elements may make measurements in a direction perpendicular to the probe axis.

The probe according to the present invention may also have a unidirectional measuring element oriented along the probe axis.

The present invention may advantageously be applied to the oil sector. Thus, it may be applied to drilling wells made either for prospecting or for production. The measurements made may be seismic measurements or pickups of fracturing, etc. The measuring elements may in particular be geophones or accelerometers.

According to one important characteristic of the present invention, the probe body is in direct contact with the walls of the well and generally substantially along one generatrix thereof.

BRIEF DESCRIPTION OF THE DRAWINGS

The present invention will be better understood and its advantages will emerge more clearly from the description hereinbelow of particular embodiments, not limitative, when taken in connection with the accompanying drawings wherein.

DETAILED DESCRIPTION

The present description relates to measurements made in geological formations, particularly those connected with the oil sector.

Figure 1:
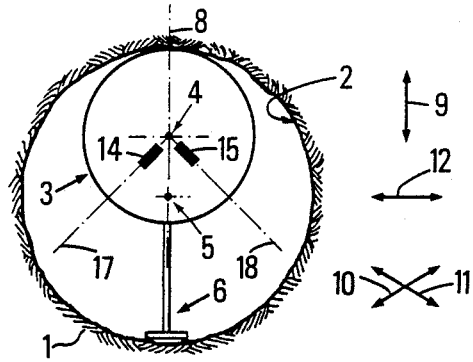
FIGS. 1 and 2 are schematic views of prior art anchoring device.
Figure 2:
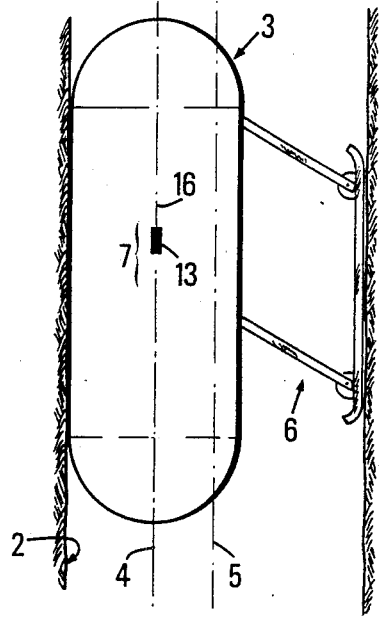

In the prior art construction of FIGS. 1 and 2, a probe generally designated by the reference numeral 3 is lowered into a well generally designated by the reference numeral 2 formed in a geological formation 1, with a longitudinal center axis 4 of the probe 3 being spaced from a center axis 5 of the well 2. An anchoring arm generally designated by the reference numeral 6 may be a system employing a deformable parallelogram such as shown in FIG. 2 or be of another type such as, for example, a simple arm.

In FIG. 2, zone 7 corresponds to the part of the probe axis 4 at which the measuring elements and/or the arm 6 are essentially located, with the zone 7 being termed the axis level.

Thus, according to the prior art, the probe 3 is attached to the well walls along a holding plane corresponding to the plane of FIG. 2 and having for a path axis or holding plane 8 shown in FIG. 1.

Such a configuration correctly transmits the movements of the geological formation in this plane and illustrated by double arrow 9 (see FIG. 1) but poorly transmits the movements not therein.

Thus, the movements illustrated by double arrows 10 and 11 which form an angle of 45° with the holding plane 8 are moderately well transmitted to the measuring elements and those illustrated by arrow 12 are very poorly transmitted, especially as the assembly of the probe 3 and the arm 6 is not rigid in the direction illustrated by arrow 12, which is perpendicular to the holding plane 8.

In summary, the mechanical coupling between the geological formation 1 and the probe 3 is only good when the geological movements of the formation 1 lie in the holding plane 8 of probe 3.

Figure 3:
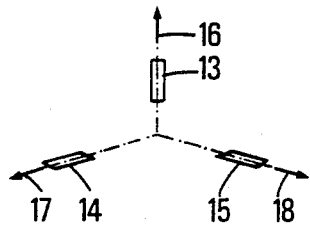
FIG. 3 is a schematic view of one arrangement of the measuring elements.

FIG. 3 illustrates a classical measuring trihedron, with the measurements being made, for example, by the three unidirectional measuring elements or pickups 13, 14, and 15 for measurements in directions 16, 17, and 18, respectively, corresponding to the trihedron axes.

Classically, axis 4 16 is parallel to or the same as the axis of the probe 3 and the axes 17 and 18 form an angle of 45° with the holding plane 8 of probe 3.

Figure 4:
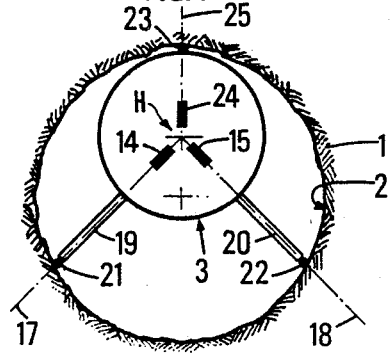
FIG. 4 is a schematic view of a particular arrangement of the arms and the measuring elements according to the present invention.

In FIG. 4, the probe 3 has a pair of arms 19, 20 disposed essentially at the level of measuring elements 13 (FIG. 2), 14, and 15. Axis 16 (FIG. 2) of measuring element 13 is parallel to axis 4 of the probe 3, and the arms 19 and 20 are deployed essentially in the planes containing measuring axes 17 and 18 of measuring elements 14 and 15. Thus, mechanical coupling between the probe 3 and the geological formation 1 is good, particularly in the measuring directions of the measuring element or pickups 14 and 15.

The probe 3 is attached to the geological formation 1 substantially at three segments, whose paths in FIG. 4 are marked 21 and 22 with respect to arms 19 and 20, and 23 with respect to the generatrix of the probe 3. The latter point is important, since it is particularly desirable for the body of the probe 3 to be in direct contact with the walls of the well 2.

Thus, the body of the probe 3 may be directly in contact with the wall of the well 2 substantially along a generatrix thereby insuring good transmission from the geological formation 1 to the sensitive measuring element or pickup of the probe 3 of the phenomena to be measured and appreciably cuts down on parasitic phenomena, in particular, the vibrations of the probes and the arms as observed in prior devices.

As shown in FIG. 4, the measuring elements 13 (FIG. 2), 14, 15 may have an additional measuring element 24 located at the same level as measuring elements 14 and 15 and whose measuring axis 25 is substantially parallel to or the same as the bisector of measuring axes 17 and 18 of measuring elements 14 and 15.

In FIG. 4, axes 17 and 18 of measuring elements 14 and 15 make an angle of 90° with each other and an angle of 135° with the measuring axis 25 of measuring element 24.

Figure 6:
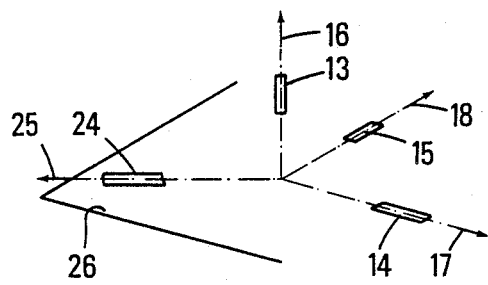
FIG. 6 is a schematic a particular configuration of the arrangement of the pickups.

According to another embodiment shown in FIG. 6, these three measuring elements 14, 15, and 24 have measuring axes 17, 18, and 25 which, taken two by two, form an angle essentially equal to 120° and are substantially in the same plane 26 with the measuring element 13 having an axis essentially perpendicular to the plane 26. The meauring axes 17, 18, and 25 correspond essentially to the directions of mechanical coupling of the probe 3.

Figure 5:
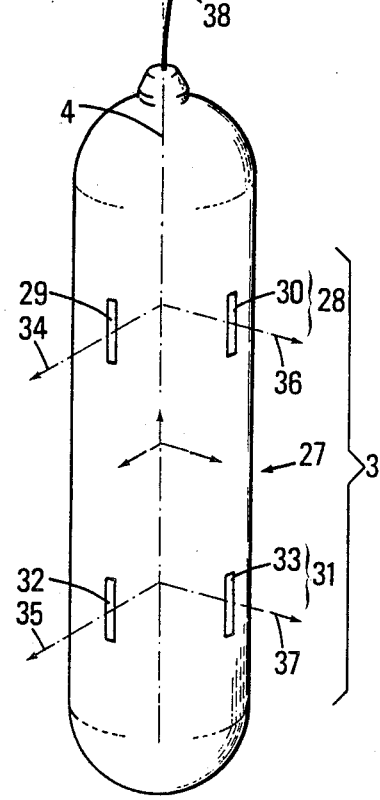
FIG. 5 is a schematic view of one embodiment comprising two arm anchoring levels, the measuring elements being placed between these two levels.

In FIG. 5 illustrates another embodiment the anchoring device has two pairs of arms located on both sides of measuring elements 27.

The first pair of arms 29, 30 is located at a first level 28, with a second pair of arms 32, 33 being located at a second level 31.

According to the embodiment of FIG. 5, the arms 29, 30, and 32, 33 when deployed remain essentially in a plane parallel to the axis of the probe 3 or preferably the axis containing it (FIG. 5).

The deployment planes of one arm of the first pair and one arm of the second pair are the same, this plane constituting a first deployment plane. The same applies to the remaining arms of the first pair and the second pair which define a second deployment plane.

The first deployment plane is defined by the center axis 4 of the probe 3 and the deployment directions 34 and 35 of arms 29 and 32, respectively.

The second plane is defined by the center axis 4 of the probe 3 and by deployment directions 36 and 37 of arms 30 and 33, respectively.

In FIG. 5, the first and second deployment planes form an angle of 90° with each other. Of courese, these planes may form an angle of 120°.

The measuring directions of two measuring elements lie in these planes and are perpendicular to center axis 4 of the probe 3. There exists a third measuring element whose measuring axis is parallel to the center axis 4 of the probe 3.

Of course, one would not depart from the scope of the present invention by having the probe 3 contain an additional unidirectional measuring element whose measuring axis was perpendicular to the center axis 4 of the probe 3 and whose axis would lie in the plane essentially defined by the center axis 4 of the probe 3 and the contact generatrix between the geological formation 1 and the probe 3, and which could be called a third deployment plane.

In FIG. 5, a flexible connecting element 38 serves to manipulate the probe 3 before anchoring and is slackened during the measurement or measurements so as not to transmit parasitic vibrations to the measuring probe 3.

The procedure for placing such a probe in position may be taken from that described in French Patent 2,544,013.

The direction-measuring elements may be accelerometer pickups or triaxial geophones.

These pickups can serve to record the geological vibrations emitted by the formation 1 upon a hydraulic fracturing, or when vibrations are emitted by a vibrator or explosives located at the surface, or coming from a seismic well source.

The arms may be arms having parallelograms or simple arms. They may or may not have anchoring points on the parts in contact with the well wall.

The actuating devices may be classical mechanical, hydraulic, or electrical devices known to the individual skilled in the art.

In FIGS. 4 and 5, it may be noted that the portion of the outer wall of the probe body is substantially close to the plane-axial bisector of the plane of deployment of the arms, and, being opposite the latter, is designed to permit firm direct holding of the body of the probe against the wall of the well. This portion of wall may be smooth or have engaging elements such as points directly attached to the probe body.

We claim:

1. Device for anchoring a probe in a well, said probe having an axis disposed in parallel to an axis of the well and having a probe body means for supporting said device, the device includes at least two anchoring arms offset angularly with respect to each other relative to said axis of said probe and said arms disposed substantially at the same level as the probe, an outer wall portion of the probe body means next to a plane bisecting deployment planes of said anchoring arms, and being opposite the planes, is constructed so as to permit a firm direct holding of said probe body means against walls of the well, and wherein said probe includes at least one direction-measuring element disposed in one of the deployment planes of said anchoring arms, said at least one measuring element being adapted to effect measurements in a direction of one of said deployment planes parallel to the probe axis and passing through one of the anchoring arms.

2. Device according to claim 1, wherein said anchoring arms are offset with respect to each other by an angle of 90° about said axis of said probe.

3. Device according to claim 1, wherein said anchoring arms are offset with respect to each other by an angle of 120° about said axis of said probe.

4. Device according to claim 1, wherein the device includes at least two other anchoring arms located at a level of the probe other than the level of the first two anchoring arms.

5. Device according to claim 4, wherein said two levels are located on both sides of the at least one measuring element of said probe.

6. Device according to claim 4, wherein said at least one measuring element is located substantially in a vicinity of one of said levels.

7. Device according to claim 1, wherein the at least one measuring element is unidirectional, and wherein the plane of deployment of said anchoring arms contains the axis of the probe, and the measuring direction of said at least one measuring element is substantially perpendicular to the axis of said probe.

8. Device according to claim 1, wherein at least two direction-measuring elements are provided, one of of said direction-measuring elements is disposed in the plane defined by deployment of one of the anchoring arms and the other of said direction-measuring elements is disposed in the plane of deployment of the other anchoring arm.

9. Device according to claim 8, wherein said anchoring arms are at the same level of said probe and the measuring elements are essentially in a vicinity of said same level.

10. Device according to claim 1, wherein at least four unidirectional measuring elements are provided each of which is designed to effect a measurement in one direction, one of said unidirectional measuring elements being positioned to perform a measurement along the axis of the probe, the other three unidirectional measuring elements being positioned to make measurements along a plane perpendicular to the axis of the probe, and wherein measuring directions of the other three unidirectional measuring elements corresponding essentially with three planes passing through the axis of the probe and through three points of contact of the probe or the anchoring device with the well walls.

* * * * *